Patented May 2, 1944

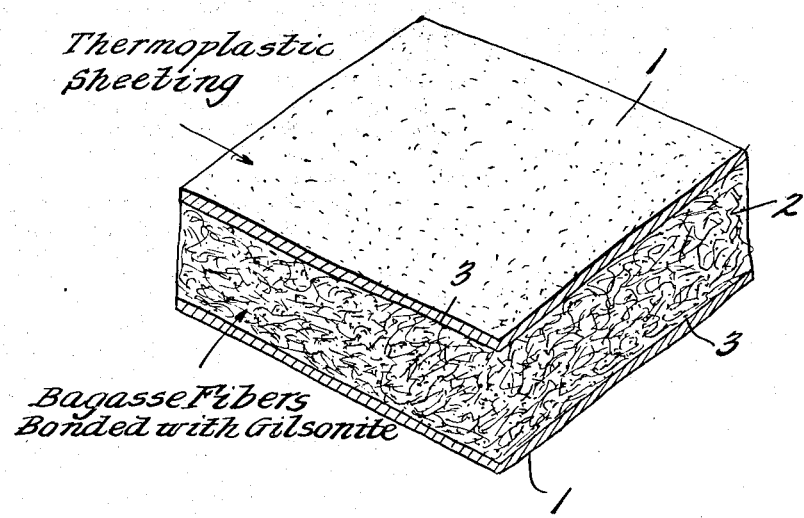

2,347,697

UNITED STATES PATENT OFFICE 2,347,697

MOLDED MATERIAL

Constance D. Levey, New Orleans, La.

Application December 2, 1939, Serial No. 307,275

3 Claims. (Cl. 154—2)

This invention relates to the production of materials capable of being produced by a molding operation under heat and pressure, and composed of fibrous products bonded together by means of a vehicle possessing thermoplastic characteristics.

Moldable materials of a thermoplastic nature have long been known and used. They are varied in form, and possess a wide range of characteristics. Most of the newer types are synthetic, and so complex in their ultimate form that the exact nature of the reactions involved, as well as the constitution of the ultimate products, are still unknown to chemical science. In addition, most of these materials because of the processing involved in their formation, are invariably quite high in price. This aspect, together with the cost of the molds, have limited the use of many of these materials to either the more expensive items, or to objects of small size. Where transparency of the ultimate object is not necessary, and where it is desired to reduce the cost, it is found desirable to add to the moldable material substantial amounts of fillers which may be in the form of inert powdered material, or fibrous in nature, such as asbestos.

Lower priced molded materials have been made by pulping fibrous materials such as wood and the grasses, and by such operations convert them into relatively thin slabs of material such as might be used for structural purposes. These products, however, obtain their structural value almost wholly as a result of the entangling of the fibres, and the roughening of their surface. This is evidenced by the fact that the pulp material is completely washed free from water soluble gums, and must pass through a beater or a Jordan before they can be satisfactorily felted into a board.

These facts are further evidence that the fibres are not bonded together by any vehicle or adhesive, but obtain their strength substantially as a result of the entanglement and surface roughness of the felted fibrous mass. These conditions enable the production of a fibreboard of high porosity, which results in good insulating value, lightness in weight, but of only moderate physical strength. Because of its nature, this type of product is suitable only as an insulating and structural board. It is wholly unsuited for the molding of small objects or for purposes which require a tough wearing surface free from any possible dusting away of the fibres from which the materials are made.

The object of my invention is the production of both structural material and objects of relatively small size made from a moldable plastic composition which is so low in price that this method of their production would yield finished products at an ultimate cost lower than by any other method of manufacture. Low priced moldable plastic materials are already known and used. Practically all of these products, however, have such a preponderance of binder or vehicle, that the fibrous or other inert filler which enter into their makeup appear to be fully enclosed by the thermoplastic product itself.

There are a number of waste farm products fibrous in nature, and composed largely of cellulosic material whose intrinsic value is hardly worth as much as its calorific capacity, otherwise known as its available B. t. u's., together with the disadvantage of the difficulty of handling these products in order to successfully burn them under controlled conditions. Because of their fibrous structure they give considerably greater strength to products with which they are incorporated in the fabrication of a molded product. These fibrous waste products include such materials as sugar cane bagasse, cornstalk fibres, oat hulls, wheatstalks, rice hulls, and the fibres from the stalks, and in fact the stalks from most cereals of these general types. These fibres are available in aggregates from an inch or so in length down to an almost impalpable powder or dust. All of these products have a use in the make-up of the type of ultimate product which I have invented. Each component in such a mixture, I have found plays a definite roll, and contributes toward the many desirable properties of the ultimate product. For example, the long fibres result in a material of great physical strength, and should the molded product crack or chip, these fibres would retain the parts tied together by such fibres even though the crack or chip had completely severed the binding material which enters into the makeup of my type of composition. The fine powders on the other hand when properly mixed with the vehicle or bonding agent completely fill the interfibrous spaces, and of themselves contribute toward a type of wearing surface definitely superior to what would be presented by the vehicle itself if it were used alone.

I have also found that there are a number of bonding agents or vehicles, thermoplastic in nature which serve in an excellent manner to bond the fibrous type of material referred to above into ultimate products of outstanding utility, and of extremely low price, probably lower than any other form of moldable material resulting in a product of satisfactory utility and longevity. Such vehicles I have found may be made up of gilsonite, rosins, asphaltums, coal tars, pitches, petroleum residium, wood gums and oleo resins, as well as related types of products. All of these forms of materials are thermoplastic in that they flow under heat and pressure, and in addition under these conditions wet the fibre surfaces and satisfactorily bond them into an integral mass. In all cases I have found that I can obtain optimum results through the use of a greater amount of fibre than vehicle. My ultimate product is dense, hard, of high physical strength, possessing good wearing surface, capable of being nailed without cracking, and at the same time resulting in high resistance to the removal of the nail. It may be sawed similar to wood and related structural material. It may be machined, drilled, punched, and worked in a variety of ways. Because of its method of manufacture, its strength is equal in all directions, and presents no wastage because of the shortcomings of a grain direction. While it is not intended to be used as a heat insulating board, its unusual physical strength both in tension and to transverse stresses make it ideally suited as a structural material for walls, ceilings, floors, as well as movable panel construction. Its low cost places it in a very favorably competitive position with that of ordinary lumber itself.

When it is considered that most sawmills have available literally mountains of waste sawdust, which has almost negative value, and as I have found that sawdust can be used alone, or in combination with the fibrous grasses referred to, and anyone or more of the vehicles referred to above, it becomes apparent that the cost of this type of building material can be available at prices lower than that of the finished lumber itself.

While it is possible to make satisfactory products using a wide range of proportions, I have found that the best results for the purposes outlined are obtained when the fibrous material is in substantially greater quantity by weight than that of the thermoplastic component. When sugar cane bagasse is used, it is preferable, though not necessary, to dry the fibre to a moisture content less than 10%. At the same time it is well to mix fibres of all lengths from a dust to possibly a half inch or more. This gives good strength for structural purposes, and at the same time a smooth, dense surface. On the other hand for small molded objects only very short fibres of one eighth inch or less, together with a large amount of dust produces the most desirable type of product, and results in a smooth polished hard surface. In addition, excellent results are obtained through the use of a small amount of bonding material and all dust or powdered fibre, producing a hard, polished surface, and desirable physical characteristics for the molding of small objects, as well as structural purposes.

Concrete examples of compositions from which I have obtained excellent results are the following:

| | Parts by weight |
|---|---|
| No. 1—Sugar cane bagasse fibre powdered | 4 |
| Gilsonite powdered | 1 |
| No. 2—Sugar cane bagasse fibre powdered | 2 |
| Gilsonite powdered | 1 |
| No. 3—Sugar cane bagasse fibre powdered | 4 |
| Rosin powdered | 1 to 2 |
| No. 4—Sawdust | 4 |
| Gilsonite or rosin | 1 to 2 |

The fibre content may be composed of full length bagasse fibre, all powdered bagasse fibre, or varying mixtures of all lengths of powder and low fibre stock. Obviously, if fibres longer than approximately 3/8" are used, it is necessarily desirable to fill the interspaces with short fibred stock, otherwise a larger percentage of binding material such as gilsonite, rosin, asphaltum, vegetable or mineral pitch or the like would necessarily have to be used. As previously outlined, the primary objective of this invention is the achievement of the lowest possible cost of production of a hard structural board, and small molded objects of satisfactory utility. This I have found to be achieved by the methods outlined herein.

The other products used and enumerated above such as corn and wheatstalk fibre as well as rice stalks and hulls, oat hulls, and similar forms of agricultural waste cellulosic material are applicable to the purposes of my invention as complete equivalents of bagasse, sawdust and cellulosic fibres in these forms. In addition, the same proportions may be adhered to and will produce ultimate materials of approximately equivalent physical characteristics and appearance.

In carrying out this invention, the fibres should be shredded to the extent outlined, and preferably under one half inch in length. It is desirable to use a goodly portion of the powdered fibre which is now a byproduct of almost negative value, and may be used alone as outlined above, producing ultimate products of very desirable characteristics. The binding material such as gilsonite, rosin, asphaltum, pitch and the like is reduced to powdered form, and thoroughly mixed with the powdered cellulosic fibres, which in turn is mixed with the long fibred stock. This mixture is then ready for the molding operation. It may be laid or spread upon the polished platen of a hydraulic press, which platen or platens are heated from some suitable source, while the two platens are brought together with pressures of from 200 to 400 pounds per square inch of pressure. The temperatures required should closely approximate that required for the fusion of the vehicle or binding material, and should not exceed temperatures which would char or carbonize the cellulosic fibres. Under these conditions the temperatures will vary from 150 degrees Fahr. up to possibly 600 degrees Fahr., the higher temperatures being obtained after the fibres are well covered and protected by the binding material. The time interval in the press is naturally a function of the thickness of the material being processed. For one quarter inch board 3 to 5 minutes is quite adequate to effect satisfactory bonding of the fibres resulting from fusion and pressure of such a vehicle as gilsonite. In order to accelerate this operation it is desirable to have the platens of the press, or of the mold which is being used, equipped with either a water jacket or a water cooling line within the same platen, this will substantially accelerate the output of the press fabricating this type of product. Using powdered bagasse of such a length as to pass through a 40 mesh screen, and gilsonite powdered to the same degree and thoroughly mixed; this material can be fabricated into an integral unit in the form of a slab or molded object of equivalent thickness approximating 1/4" by heating to 250 degrees Fahr. in 3 minutes, and at a pressure of 200 lbs. per square inch, which will result in an excellent product of general utility.

If the platens are highly polished, and preferably chromium plated no difficulty will be experienced due to adhesion of this molded product to such surfaces. Should adhesion be experienced however, I have discovered that a mixture of powdered graphite with water to which a small amount of gum arabic has been added, and worked up into a cream, and applied as a thin coating film over such surfaces, will prevent adhesion. A paste made up of graphite, paraffin wax and gasoline was also effective in inhibiting adhesion.

In conducting this molding operation, I have been successful in building up a laminated hard board in a single operation by laying on the face of one or both platens a sheet of thermoplastic material such as cellulose acetate, ethyl cellulose, polystyrene, vinyl ester sheeting, uncured phenol-aldehyde or urea-formaldehyde, and other forms of sheeting of these general types; and between same spread the desired thickness of powdered cellulosic fibre and binding material such as gilsonite, rosin and the like. This will produce as an ultimate material a faced laminated hard board. The thermoplastic sheeting may be dyed or pigmented the desired color, pattern or mottled effect, as may be desired.

If a light colored rosin is used as the binding material, various colors of pigments may be incorporated with the powdered rosin and powdered fibre, resulting in the production of a molded product or hard board of the color effect which may be desired, with the possible limitations of colors approaching white, based upon the paleness of the rosin and the lightness of the color of the fibre used.

I have found that a highly satisfactory dense structural board can be made by using asphaltum or gilsonite in which has been dissolved a few percent of phenolic derivatives of high germicidal value. The ratio of binder to fibre as well as the method of manufacture is the same as has been outlined previously. This results in a structural board practically immune to the attack of termites, rodents, and boring insects. It is also practicable to permeate the cellulosic fibres with such insect inhibitors using sodium meta-arsenite as well as other forms of soluble arsenic. In addition, sodium fluoride and sodium silicofluoride may also be used for this purpose.

I have also found that if these fibres are immersed in a water solution of ammonium phosphate, the water soluble borophosphates, and other similar types of water soluble salts, that the fire inhibiting characteristics of this form of structural material is rendered most effective.

The structural board as well as the molded objects can be readily covered or surfaced with a properly formulated coating composition. This product must not contain active solvents or the gilsonite or other binder would otherwise "strike through," and thereby discolor or possibly disintegrate the applied coating. Water soluble coating compositions can of course be readily used. These may be made up of such vehicles as casein, glue, albumen, the starches, zein and emulsions of water insoluble products dissolved in some volatile organic solvents. Most of the paint pigments can be successfully used in the formulation of this type of paint. If it is desired to coat this structural board and molded objects made by my process and of the compositions which I have discovered, then it is only necessary to apply initially one or more coats of the water soluble coating compositions described above, after which any of the paint, enamel, varnish or lacquer coatings available may then be applied. Application may be effected by means of brush, spray, dipping or printing upon that surface.

In the molding operation any configuration which may be engraved or otherwise formed on these platen surfaces, will be readily reproduced on the finished structural board or molded object. The depth of the configurations are limited only by the thickness of the board about to be fabricated.

As these boards are bonded by a non-thermosetting thermoplastic, the ultimate board can be readily reshaped into other molded objects by the application of heat and pressure in molds of suitable contour. The boards may be built up or laminated into thicker boards by the application of a thin layer of bonding material which may be made up of the powdered vehicle only, or approximately equal parts by weight of the finely powdered fibres mixed with the vehicle. The structural boards may be satisfactorily bonded to each other at their edges by placing such edges within an eighth of an inch of each other, and filling this gap with the powdered vehicle, placing the adjacent boards in a press, and on the application of heat and pressure the powdered vehicle will fuse and bond the edges resulting in the formation of a combined board.

The mixture of powdered cellulose fibre and powdered gilsonite or rosin may be used in an injection molding machine under controlled conditions as to the temperature of its heating unit, and the varying of the ratio of fibre to bonding material to prevent sticking or adhesion to the feeding screw of the machine, the unfabricated mixture is otherwise used the same as regular molding powders.

The accompanying drawing illustratively sets forth the article which is the subject of the present invention. The compacted mass of bagasse fibers bonded with gilsonite is identified by the numeral 2. This compacted mass is bonded on its upper and lower surfaces by a thermoplastic sheeting identified by the numeral 1, the bond joint or interface being designated by the numeral 3.

I claim:

1. A composite article composed of a pressure molded mixture of powdered bagasse capable of passing through a 40 mesh screen, and powdered gilsonite, there being present one to two parts of gilsonite to four parts by weight of powdered bagasse at least one outer surface of said article comprising pre-formed thermoplastic sheeting pressure-bonded to the bagasse.

2. A composite article composed of a highly compacted mixture of powdered bagasse having less than 10% of moisture, and powdered gilsonite, there being present 1 to 2 parts of the gilsonite to 4 parts by weight of the bagasse, at least one outer surface of the article comprising pre-formed thermoplastic sheeting bonded to the bagasse.

3. A composite article composed of a highly compacted mixture of a cellulose base selected from the group consisting of bagasse and sawdust, and a binder selected from the group consisting of gilsonite and rosin, there being present 1 to 2 parts of the binder to 4 parts by weight of the cellulose base, at least one outer surface of said article comprising pre-formed thermoplastic sheeting pressure bonded to the bagasse.

CONSTANCE D. LEVEY.